US012494029B2

United States Patent
Kucherera et al.

(10) Patent No.: US 12,494,029 B2
(45) Date of Patent: Dec. 9, 2025

(54) SELECTING INITIAL CORRESPONDENCES USED IN CO-REGISTRATION OF FACE IMAGES

(71) Applicant: Lenovo Enterprise Solutions (Singapore) Pte Ltd., Singapore (SG)

(72) Inventors: Tinashe Kucherera, Raleigh, NC (US); Lake Robert Maxwell, Cary, NC (US); Connor Raines, Monroe, NC (US); Jeffrey S Holland, Morrisville, NC (US)

( * ) Notice: Subject to any disclaimer, the term of this patent is extended or adjusted under 35 U.S.C. 154(b) by 153 days.

(21) Appl. No.: 18/417,198

(22) Filed: Jan. 19, 2024

(65) Prior Publication Data

US 2025/0239035 A1    Jul. 24, 2025

(51) Int. Cl.
| | |
|---|---|
| *G06T 19/00* | (2011.01) |
| *G06T 19/20* | (2011.01) |
| *G06V 10/74* | (2022.01) |
| *G06V 40/16* | (2022.01) |

(52) U.S. Cl.
CPC ............ *G06T 19/20* (2013.01); *G06V 10/761* (2022.01); *G06V 40/171* (2022.01); *G06T 2219/2004* (2013.01)

(58) Field of Classification Search
None
See application file for complete search history.

(56) References Cited

U.S. PATENT DOCUMENTS

| | | | |
|---|---|---|---|
| 7,856,125 B2 * | 12/2010 | Medioni | G06V 20/647 |
| | | | 382/294 |
| 10,460,493 B2 * | 10/2019 | Imoto | G06T 1/00 |
| 10,572,720 B2 * | 2/2020 | Hu | G06T 7/55 |
| 11,003,892 B2 * | 5/2021 | Li | G06V 10/806 |
| 11,875,601 B2 * | 1/2024 | Li | G06T 3/147 |
| 11,887,320 B1 * | 1/2024 | Sullivan | G01B 11/2518 |
| 2014/0160123 A1 * | 6/2014 | Yang | G06T 17/00 |
| | | | 345/420 |
| 2017/0278302 A1 * | 9/2017 | Varanasi | G06T 7/33 |
| 2021/0209839 A1 * | 7/2021 | Hu | G06T 17/00 |
| 2022/0284679 A1 * | 9/2022 | Lin | G06T 5/50 |
| 2022/0327851 A1 * | 10/2022 | Flagg | G06F 16/55 |
| 2023/0162332 A1 * | 5/2023 | Yang | G06T 17/00 |
| | | | 348/241 |
| 2024/0086508 A1 * | 3/2024 | Upadhyay | G06V 40/172 |

* cited by examiner

*Primary Examiner* — Martin Mushambo
(74) *Attorney, Agent, or Firm* — Jeffrey L. Streets (57) ABSTRACT

A computer program product provides for obtaining first and second three-dimensional point clouds from first and second three-dimensional face images. The first three-dimensional point cloud is orthogonally projected onto a two-dimensional plane to form a first two-dimensional point cloud. A first set of initial correspondence points are identified in the first two-dimensional point cloud before orthogonally projecting the identified first set of initial correspondence points from the first two-dimensional point cloud back to the first three-dimensional point cloud to identify a first set of initial correspondence points in the first three-dimensional point cloud. An initial transformation matrix is determined that, when applied to the identified first set of initial correspondence points in the first three-dimensional point cloud, co-registers the first set of initial correspondence points and/or the first point cloud with a second set of initial correspondence points associated with the second three-dimensional point cloud and/or the second point cloud.

20 Claims, 9 Drawing Sheets

SELECTING INITIAL CORRESPONDENCES USED IN CO-REGISTRATION OF FACE IMAGES

BACKGROUND

The present disclosure relates to processes for co-registration of faceprints obtained from face images, where the co-registration may be performed in support of a face recognition process.

BACKGROUND OF THE RELATED ART

Face recognition or facial recognition refers to technology that can automatically recognize a human face from a digital image. While face detection can identify the presence of a human face in a digital image, face recognition goes further to include some face comparison or face matching between the human face found in one image and the human face found in another image. Typically, the face comparison is performed after processing the image into a smaller data set that represents the differentiating features of a face. This smaller data set is known as a "faceprint."

Face identification is one type of face recognition. In face identification, a faceprint from a new face image is obtained and compared against a database of known faceprints, where each known faceprint is associated with a specific known individual. If the faceprint from the new face image is sufficiently similar to any of the known faceprints, then a facial recognition system returns a potential match. For example, the new face image may be obtained by a security camera outside a secure area and the database of known faceprints may include a faceprint for every person that is authorized to access the secure area. If the security camera obtains a new face image of a person with a faceprint that is sufficiently similar to a faceprint in the authorized person database, then a security system connected to the security camera may enable the person to access the secure area.

Face verification is another type of facial recognition. In face verification, a faceprint from a new face image is obtained and compared to a stored faceprint. The face comparison or face matching is performed without necessarily knowing or determining the identity of the person associated with the face. For example, a smartphone owner may setup their smartphone with one or more face images of authorized users, where the smartphone may store at least the faceprints of the authorized users. Subsequently, the smartphone will unlock in response to a camera on the smartphone capturing a face image having a faceprint that is sufficiently similar ("matches") a stored faceprint of one of the authorized users.

Face clustering is yet another type of facial recognition that processes faceprints from a set of images in order to cluster or group the images that show the same person. For example, face clustering may be used by a smartphone to form separate clusters of images for each person that appears in more than a predetermined number of images stored in a photos folder.

Face tracking is a further type of facial recognition. In face tracking, faceprints are processed from multiple face images and compared for the purpose of tracking a person's movement. Face tracking does not attempt to determine the identity of the person, but rather to merely determine the movement of the person.

A facial recognition system may utilize a digital camera to capture a face image and provide the face image to a facial recognition software application. However, depending upon the task to be performed, the facial recognition application may attempt co-registration of any two face images that are being compared. The term "co-registration" refers to a process of geometric alignment of two face images that were captured from different angles and are, therefore, in different co-ordinate spaces. The co-registration process transforms one of those images onto the other image so that they are in the same co-ordinate space. However, a critical step in automated co-registration of two face images is the selection of initial correspondences or correspondence points (i.e., landmarks or matching features) on the point clouds of the two images.

BRIEF SUMMARY

Some embodiments provide a computer program product comprising a non-volatile computer readable medium and non-transitory program instructions embodied therein, the program instructions being configured to be executable by a processor to cause the processor to perform one or more operations. The operations comprise obtaining a first three-dimensional point cloud from a first three-dimensional face image and obtaining a second three-dimensional point cloud and a second set of initial correspondence points associated with a second three-dimensional face image. The operations further comprise orthogonally projecting the first three-dimensional point cloud onto a two-dimensional plane to form a first two-dimensional point cloud, identifying a first set of initial correspondence points in the first two-dimensional point cloud, and orthogonally projecting the identified first set of initial correspondence points from the first two-dimensional point cloud to the first three-dimensional point cloud to identify a first set of initial correspondence points in the first three-dimensional point cloud. Still further, the operations comprise determining an initial transformation matrix that, when applied to the identified first set of initial correspondence points in the first three-dimensional point cloud, coregisters the first set of initial correspondence points in the first three dimensional point cloud with the second set of initial correspondence points associated with the second three-dimensional point cloud.

DETAILED DESCRIPTION

Some embodiments provide a computer program product comprising a non-volatile computer readable medium and non-transitory program instructions embodied therein, the program instructions being configured to be executable by a processor to cause the processor to perform one or more operations. The operations comprise obtaining a first three-dimensional point cloud from a first three-dimensional face image and obtaining a second three-dimensional point cloud and a second set of initial correspondence points associated with a second three-dimensional face image. The operations further comprise orthogonally projecting the first three-dimensional point cloud onto a two-dimensional plane to form a first two-dimensional point cloud, identifying a first set of initial correspondence points in the first two-dimensional point cloud, and orthogonally projecting the identified first set of initial correspondence points from the first two-dimensional point cloud to the first three-dimensional point cloud to identify a first set of initial correspondence points in the first three-dimensional point cloud. Still further, the operations comprise determining an initial transformation matrix that, when applied to the identified first set of initial correspondence points in the first three-dimensional point cloud, co-registers the first set of initial correspondence points in the first three-dimensional point cloud with the second set of initial correspondence points associated with the second three-dimensional point cloud.

A three-dimensional point cloud is a set of data points in space that may represent the location of points on a surface of a three-dimensional (3D) shape or object. In the present embodiments, the 3D shape or object is a person's face. Optionally, a point cloud may provide additional information about the surface of an object other than just the location of each data point. For example, the Polygon File Format (PLY) is a computer file format that is used to store three-dimensional data from 3D scanners. The PLY format supports a relatively simple description of a single object as a list of nominally flat polygons. A PLY file starts with a header that specifies the elements of a mesh and their types, where the header is followed by a list of elements such as vertices, faces, edges, range maps and triangle strips. The vertices in a PLY file may form a three-dimensional point cloud.

A three-dimensional face image may be obtained or captures using a depth camera. In addition to capturing a two-dimensional (2D) image, a depth camera can measure the distance from the depth camera to each point in the image. A depth camera can measure these distances using various techniques, such as a time-of-flight technique that determines distance as a function of the amount of time for light, such as a laser pulse, to travel from the camera to an object and back to the camera. Accordingly, a depth camera can produce output data representing a three-dimensional image or point cloud. For example, each pixel or point in the image may be defined by a horizontal position or coordinate, a vertical position or coordinate, and a depth position or coordinate. Other coordinate systems may be used, but a three-dimensional Cartesian coordinate system is suitable for identifying the position of each point in an image or point cloud. Specifically, a particular point may be described by Cartesian coordinates denoted by the letters X, Y and Z arranged in a tuple (X, Y, Z), where the X value represents a distance along a first axis (X-axis), the Y value represents a distance along a second axis (Y-axis), and the Z value represents a distance along a third axis (Z-axis).

Depending upon the nature of the face recognition application being performed, the first and second three-dimensional face images and/or the first and second three-dimensional point clouds representing the first and second three-dimensional face images may be obtaining from the same or different sources, such as one or more depth cameras or a data storage device storing previously obtained three-dimensional face images and/or point clouds. Optionally, a stored three-dimensional face image and/or point cloud may also be associated with previously identified facial landmarks that can be used as initial correspondences.

The term "orthogonal projection", as used herein, refers to the projection of a three-dimensional point cloud to a two-dimensional plane that is orthogonal to the forward direction of the three-dimensional face image that formed the three-dimensional point cloud. For example, a face may be characterized by a forward-directed vector and the two-dimensional plane may be orthogonal to that forward-directed vector. Generally speaking, if a person faces a flat mirror and looks directly at their own face in the mirror, then the mirror lies in a two-dimensional plane that is orthogonal to the person's face. By orthogonally projecting the three-dimensional point cloud onto a two-dimensional plane, the resulting two-dimensional point cloud should include all of the person's facial features or landmarks, such as eyes, nose, mouth, and jaw. Accordingly, the two-dimensional point cloud may be used as the data source for identifying facial landmarks. It should also be recognized that points in the two-dimensional plane may be orthogonally projected onto a three-dimensional surface, such as the three-dimensional point cloud from which the two-dimensional point cloud was obtained. In other words, every point in the two-dimensional point cloud is uniquely associated with a point in the three-dimensional point cloud because these two points are forward and reverse orthogonal projections of each other. Once the three-dimensional initial correspondence points have been identified, the initial correspondence points in the first and second point clouds may be used in a co-registration operation, such as a 3D least squares operation that determines an initial transformation that minimizes the sum of the squares of the distances between matched correspondence points.

An "initial correspondence" (or "initial correspondence point") is a point in one face image that corresponds to a point in another face image. A set of initial correspondences (or "initial correspondence points") in one face image and a set of initial correspondences in another face image may be used to co-register the two face images. The terms "co-registering" and/or "co-registration" refer to a process of geometric alignment of two face images that were captured from different angles. Accordingly, the two face images are initially in different coordinate spaces. The idea of co-registration is to transform one of those face images onto the other face image so that they are in the same co-ordinate space. Once the two face images are in the same co-ordinate space, distances between corresponding points in the point clouds representing the two face images can be used to determine whether or not the face images are from the same person. In one option, the initial correspondence points for each face image are facial landmarks. "Facial landmarks" are a set of key points on a human face that can be used to distinguish one face from another. Non-limiting examples of facial landmarks include points associated with the nose, eyebrow, mouth, eye corners, and jaw line. Facial landmarks and/or other initial correspondence points may be present in both two-dimensional and three-dimensional point clouds or face images, and orthogonal projections between two-dimensional and three-dimensional point clouds allows any facial landmark and/or other initial correspondence point in a two-dimensional point cloud to be used to identify a corresponding facial landmark and/or other initial correspondence point in the three-dimensional point cloud, and vice versa.

A "transformation matrix" contains parameters that map a first (source) three-dimensional face image, point cloud or correspondence points to a second (target or reference) three-dimensional face image, for example through translation and/or rotation relative to one or more coordinate axis. An initial transformation matrix may be calculated using initial correspondence points identified for the first and second three-dimensional point clouds. However, applying the initial transformation matrix may or may not provide the optimal co-registration of the first three-dimensional point cloud with the first three-dimensional point cloud. So, some embodiments provide for the calculation and use of one or more subsequent transformation matrices. Subsequent transformation matrices may be calculated using correspondence points produced/selected by an Iterative Closest Point (ICP) algorithm, which includes a 3D-least squares operation. A "transformation matrix" may be an array, such as a 3×3 array. In a Python program, a 3×3 transformation matrix may have the representation: $T=[[T_1, T_2, T_3], [T_4, T_5, T_6], [T_7, T_8, T_9]]$ Although a transformation matrix may be calculated on the basis of the correspondence points for the first and second point clouds, the transformation matrix may be applied to every point in the first point cloud (i.e., the point cloud that is being moved onto the other point cloud) including the correspondence points in the first point cloud. For example, the initial transformation matrix may be calculated giving only consideration the to the initial correspondence points in the first and second three-dimension point clouds, but the initial transformation matrix may be applied to every point in the first three-dimensional point cloud so that the first three-dimensional point cloud is transformed onto or toward the second three-dimensional point cloud.

A critical step in automated co-registration of two face images or their point clouds is the selection of initial correspondences (i.e., face landmarks or matching features) on the point clouds of the two face images. The process of making selection of initial correspondences may take a lot of time and is highly vulnerability to mistake or a less than optimal selection. The present embodiments select initial correspondences of the two face images more accurately and quickly to support co-registration of the face images. Specifically, although the face images are a 3D image, the selection of initial correspondences is made in a 2D plane. Accordingly, the 3D image is orthogonally projected onto a 2D plane and then the initial correspondences are detected/selected using the 2D projected face image. After selecting the initial correspondences, the process may then reverse the projection (i.e., calculate an orthogonal reverse projection) of the 2D initial correspondences back to their associated 3D coordinates.

In some embodiments, the operation of determining the initial transformation matrix includes matching each point in the first set of initial correspondence points in the first three-dimensional point cloud with a corresponding point in the second set of initial correspondence points in the second three-dimensional point cloud, and calculating the initial transformation matrix to minimize an error metric based on distances between the matched points in the first and second three-dimensional point clouds. In one option, the first set of initial correspondence points includes a set of facial landmarks in the first three-dimensional face image and the second set of initial correspondence points includes a set of facial landmarks in the second three-dimensional face image. A point in the first set of initial correspondences may "match" or "correspond with" a point in the second set of initial correspondences by virtue of being identified as the same facial landmark. For example, one facial landmark might be the inside corner of a person's right eye shown in a face image. The facial landmark detector of Dlib uses a 68 point model that maps to specific facial structures, including the inside corner of a person's right eye (on the left in a face image of the person) as point #40. Accordingly, a point associated with an inside corner of a right eye in the first three-dimensional point cloud is "matched" with a point associated with an inside corner of a right eye in the second three-dimensional point cloud since these two points identify the locations of the same facial structure. A distance ($d_{1-2}$) between the matched points in the two point clouds may be determined using the three-dimensional coordinates of the first point ($x_1, y_1, z_1$) and the second point ($x_2, y_2, z_2$) in the equation: $d_{1-2}=((x_2-x_1)^2+(y_2-y_1)^2+(z_2-z_1)^2)^{0.5}$. A non-limiting example of an error metric based on distances between the matched points in the first and second three-dimensional point clouds is the sum of the squares of distances between the matched points (i.e., the "least squares" method). So, if there are 68 points in each of the first and second sets of initial correspondences, then there are 68 distances therebetween. Accordingly, minimizing this error metric might mean minimizing the sum of the squares of the 68 distances.

In some embodiments, the operation of identifying the first set of initial correspondence points in the first two-dimensional point cloud may include providing the first two-dimensional point cloud to the Dlib digital image processing library and receiving two-dimensional coordinates for each point in the first set of initial correspondence points (i.e., facial landmarks) in the first two-dimensional point cloud from the Dlib digital image processing library. Of course, the second set of initial correspondence points in the second point cloud may be identified in the same manner as the first set of initial correspondence points in the first point cloud, but the embodiments are not limited to using the same manner or method. Optionally, the second set of initial correspondence points in the second point cloud may have been previously determined using the same or different manner or method, and retrieved from a storage device where the second point cloud or second face image are stored. In a preferred embodiment, the first set of initial correspondence points in the first two-dimensional point cloud may be a set of two-dimensional coordinates for facial landmarks, such as those facial landmarks detected using the Dlib digital image processing library. Dlib (Digital Library) has is an open-source Python library that includes a 68-point model for face landmark detection. The Python code file name is "facial_68_landmark.py". Dlib has a facial feature detection machine learning (ML) function that supports the identification of 2D facial landmark structures or features in human faces using Artificial Intelligence that has been trained to recognize facial features in a 2D image.

In some embodiments, the first set of initial correspondence points in the first three-dimensional point cloud and/or the second three-dimensional point cloud may be identified automatically without human intervention. Automatic identification of the initial correspondence points is a great technological benefit. For example, orthogonally projecting the three-dimensional point cloud to a two-dimensional plane to obtain a two-dimensional point cloud enables embodiments to subsequently provide the two-dimensional point cloud to Dlib for facial landmark detection. The facial landmarks identified by Dlib may then be back projected onto the three-dimensional point cloud to obtain the initial three-dimensional correspondence points. It should be appreciated that existing techniques can require human intervention and judgement to directly select initial correspondence points, such as facial landmarks, in a three-dimensional point cloud or the associated three-dimensional facial image.

In some embodiments, the operation of projecting the identified first set of initial correspondence points from the first two-dimensional point cloud to the first three-dimensional point cloud to identify a first set of initial correspondence points in the first three-dimensional point cloud may include providing the two-dimensional coordinates for each point in the first set of initial correspondence points in the first two-dimensional point cloud and the first three-dimensional point cloud to the Open Source Computer Vision library, and receiving three-dimensional coordinates for each point in the first set of initial correspondence points in the first three-dimensional point cloud at output from the Open Source Computer Vision library (OpenCV, a Python library). Accordingly, the output received from Dlib (i.e., the coordinates for the first set of initial correspondence points in the two-dimensional point cloud) as well as the first three-dimensional point cloud may be provided to OpenCV to perform the reverse projection and provide the three-dimensional coordinates for each point in the first set of initial correspondence points in the first three-dimensional point cloud. Optionally, OpenCV may also perform the forward orthogonal projection of the first three-dimensional point cloud onto a two-dimensional plane to form a first two-dimensional point cloud by providing the first three-dimensional point cloud and a selected field of view to the projectPoints function in the OpenCV.

In some embodiments, the second set of initial correspondence points associated with a second three-dimensional face image may be obtained by the same operations used to obtain the first set of initial correspondence points associated with the first three-dimensional face image. Namely, the operations may include projecting the second three-dimensional point cloud onto a two-dimensional plane to form a second two-dimensional point cloud, identifying a second set of initial correspondence points in the second two-dimensional point cloud, and projecting the identified second set of initial correspondence points from the second two-dimensional point cloud to the second three-dimensional point cloud to identify the second set of initial correspondence points in the second three-dimensional point cloud. For example, the second set of initial correspondence points in the second two-dimensional point cloud may be obtained by providing the second two-dimensional point cloud to the Dlib digital image processing library and receiving two-dimensional coordinates for each point in the second set of initial correspondence points (i.e., facial landmarks) in the second two-dimensional point cloud from the Dlib digital image processing library.

In some embodiments, the operation of projecting the first three-dimensional point cloud onto a two-dimensional plane to form a first two-dimensional point cloud and the operation of projecting the identified set of initial correspondence points from the first two-dimensional point cloud to the first three-dimensional point cloud to identify initial correspondence points in the first three-dimensional point cloud are preferably performed using the same field of view for the first three-dimensional point cloud. In other words, the forward and reverse projections may use the same field of view (i.e., angle from which to perform the orthogonal projections). Using another field of view might not detect the facial landmarks that are desired and failing to perform the reverse projection onto the three-dimensional point cloud may mean a loss of a third coordinate for each point in the point cloud. The operations preferably select a field of view of the first three-dimensional point cloud that includes facial features corresponding to the identified set of initial correspondence points, wherein the facial features may, for example, include eyes, eyebrows, nose, mouth, and jaw in the first three-dimensional face image. In one option, a plurality of fields of view of the first three-dimensional point cloud may be iteratively evaluated for the presence of a set of facial features until identifying the selected field of view that includes each of the facial features within the set.

In some embodiments, the operations may further include a tolerance check. If the positions of the first and second three-dimensional point clouds are sufficiently close (i.e., the tolerance is low), then the operations may be concluded. For example, when the tolerance value is below a tolerance threshold, then a facial recognition may proceed to determine whether or not the first face image is a positive match with the second face image. The operations of the tolerance check may include, for example, determining which of the first and second three-dimensional point clouds has the fewest number of points, calculating an initial tolerance value based on, for each point in the first or second point cloud having the fewest number of points, a distance between the point and the closest point in the other of the first or second point cloud after applying the initial transformation matrix to the first three-dimensional point cloud, and determining whether the calculated initial tolerance value is less than a predetermined tolerance value. Note that the initial transformation matrix may be determined using the initial correspondence points in each three-dimensional point cloud. The same operations may be subsequently performed in some embodiments to determine a subsequent tolerance value after applying a subsequent transformation matrix to the first three-dimensional point cloud. The subsequent transformation matrix may be determined using one or more iterations of the Iterative Closest Point (ICP) algorithm, which includes the use of 3D least squares to co-register the point clouds. Specifically, each iteration may include a new correspondence search, co-registration and tolerance check. These iterations may continue until a stop condition (i.e., a tolerance threshold) has been met or satisfied. In one example, the stop condition for this algorithm may be the relative sum of the squares of distances between matched points in the two point clouds. In other words, the iterations may stop in response to determining that the difference in the sum of the squares of distances between matched points for iterations n and n+1 are below a predetermined setpoint value x (in units of distance squared), such as x=0.0001 meters$^2$. In one option, a tolerance value (t) is equal to the sum of the distance between a point in the source point cloud (after co-registration) and the closest point in the target point cloud for all points in the point cloud having the fewest points. For example, if a source image has 10,000 points and a target image has 9,000 points then t=Σ(distance to a closest point in the source image) for each of the 9,000 points in the target image. It is ideal if both source and target images have the same number of points, but that is not always the case.

Iterative Closest Point (ICP) is an algorithm employed to minimize the difference between two point clouds. The ICP algorithm keeps the second (target or reference) point cloud fixed while transforming the first (source) point cloud to best match the target point cloud. The transformation may include translational movement of the source point cloud, rotation of the source point cloud, or some combination of translation and rotation of the source point cloud. The ICP algorithm determines the transformation that minimizes an error metric between the source and target point clouds, such as the sum of squared distances between matched pairs of points. Each matched pair of points includes a point (one of the vertices) in the source point cloud and the closest point (one of the vertices) in the target (reference) point cloud. The ICP algorithm may treat correspondence as a variable to be estimated during each iteration.

During each iteration, the first (source) three-dimensional point cloud and the second (target or reference) three-dimensional point cloud are inputs to the ICP algorithm. The output of the ICP algorithm is the refined transformation that minimizes the error metric (or reaches some criteria that approximates the minimum of the error metric) between the source and target point clouds. In one example, the ICP algorithm steps include: (1) for each point in the source point cloud (either using the whole set of vertices or a selected subset of vertices, such as the facial landmarks) match or associate the closest point in the reference point cloud (or the selected subset), (2) estimate the combination of rotation and translation (i.e., a "transformation") using a point-to-point distance error metric minimization technique (i.e., sum of the squares or root mean square) which will best align each source point to its matching target point identified in the previous step, (3) transform the source points using the obtained transformation, and (4) iterate steps (1)-(3) (re-associate the closest points, determine and apply a new transformation, and so on) until the error metric is less than a tolerance threshold. It should be noted that, during each iteration of ICP, the correspondence search may cause one or more of the points in the source point cloud (such as one of the vertices in a source PLY file) to be matched with a different point in the target point cloud (such as a different one of the vertices in a target PLY file) before each co-registration operation is performed.

In some embodiments, the operations may further comprise (i) identifying revised correspondence points in the first and second three-dimensional point clouds including, for each point in the first three-dimensional point cloud, a corresponding point in the second three-dimensional point cloud that is the closest to the point in the first three-dimensional point cloud; (ii) determining a revised transformation matrix that minimizes a first error metric based on distances between the revised correspondence points in the first and second three-dimensional point clouds; (iii) applying the revised transformation matrix to the first three-dimensional point cloud; (iv) calculating a revised tolerance value based on, for each point in the first or second point cloud having the fewest number of points, a distance between the point and the closest point in the other of the first or second point cloud after applying the revised transformation matrix to the first three-dimensional point cloud; and repeating operations (i), (ii), (iii) and (iv) until the revised tolerance value is less than a predetermined tolerance threshold. In one option, the first error metric based on distances between the revised correspondence points in the first and second three-dimensional point clouds may be a sum of the squares of the distances between the revised correspondence points in the first and second three-dimensional point clouds. In another option, steps (i) and (ii) may be performed using the Iterative Closest Point algorithm, where the operations further comprise providing the second three-dimensional point cloud and the first three-dimensional point cloud after applying the revised transformation matrix as inputs to the Iterative Closest Point algorithm. In a further option, operations (i), (ii) and (iii) may be initiated only in response to the calculated initial tolerance value being greater than the predetermined tolerance threshold after applying the initial transformation matrix to the identified first set of initial correspondence points in the first three-dimensional point cloud.

In some embodiments, the two co-registered point clouds or facial images may be used to make a facial recognition decision, such as whether or not the two co-registered point clouds or facial images are sufficiently similar to be considered the same person. For example, if a distance based error metric between the two point clouds, two sets of correspondence points, or two facial images is less than a matching threshold, then it may be decided that the two co-registered point clouds or facial images are of the same person. Such a decision may be useful in, for example, face verification, face recognition, face clustering and face tracking applications. Alternatively, the two co-registered point clouds or facial images may form a single output image showing the two point clouds or facial images in their co-registered positions such that the extent of deviation or similarity between the two co-registered point clouds or facial images may be readily apparent to an observer.

It should be appreciated that the selection of the initial correspondence points can have a significant impact on the quality of the co-registration. In other words, poor selection of the initial correspondences may cause ICP to continue selecting correspondences that are not even close to optimal, such that the two images may never reach their best possible co-registration. For example, when doing ICP point to point, it might occur that the source image is rotated such that a point on the nose in the source image is picked to be closest to a point on the eye in the target image, then the co-registration process will work to shift the nose in the source image towards the eye in the target image. It is possible that numerous iterations of ICP will never lead to the optimal co-registration of the source and target images. The present embodiments address the problem of selecting accurate initial correspondence points by using the Artificial Intelligence in Dlib that has already been trained to recognize facial features in a 2D image. The present embodiments provide the technical benefit of increased accuracy and automation of the co-registration of two facial images and/or their three-dimensional point clouds by using a 3D to 2D orthogonal projection that facilitates the use of Dlib for facial landmark identification and a subsequent 2D to 3D orthogonal projection that identifies the position of the facial landmarks in the 3D face image or point cloud.

In some embodiments, the co-registered point clouds or facial images may be used in applications related to virtual reality (VR) and digital twins. For example, a VR headset typically has an array of cameras and infrared (IR) sensors. Each camera and IR sensor will capture information simultaneously from a different angle. A processor in the headset or connected computer receives the stream of images from each of the cameras and sensors with the associated depth information that forms a point cloud. When doing pass-through instead of just using the image from the primary camera, the processor may co-register all the images coming in from the different cameras and produce a co-registered wide angle image that is fuller and more immersive. When the 3D images contain human faces in them, the processor may co-register the face images according to the present embodiments, so that the face images are not distorted during the co-registration and display. Alternatively, the present embodiments may be use in a process of creating a digital twin of a person for use in a digital twin workspace or metaverse. For example, a body scan may produce multiple 3D images of a person and present embodiments may be used to co-register the body scans to make a 3D digital clone of the person.

Figure 1:
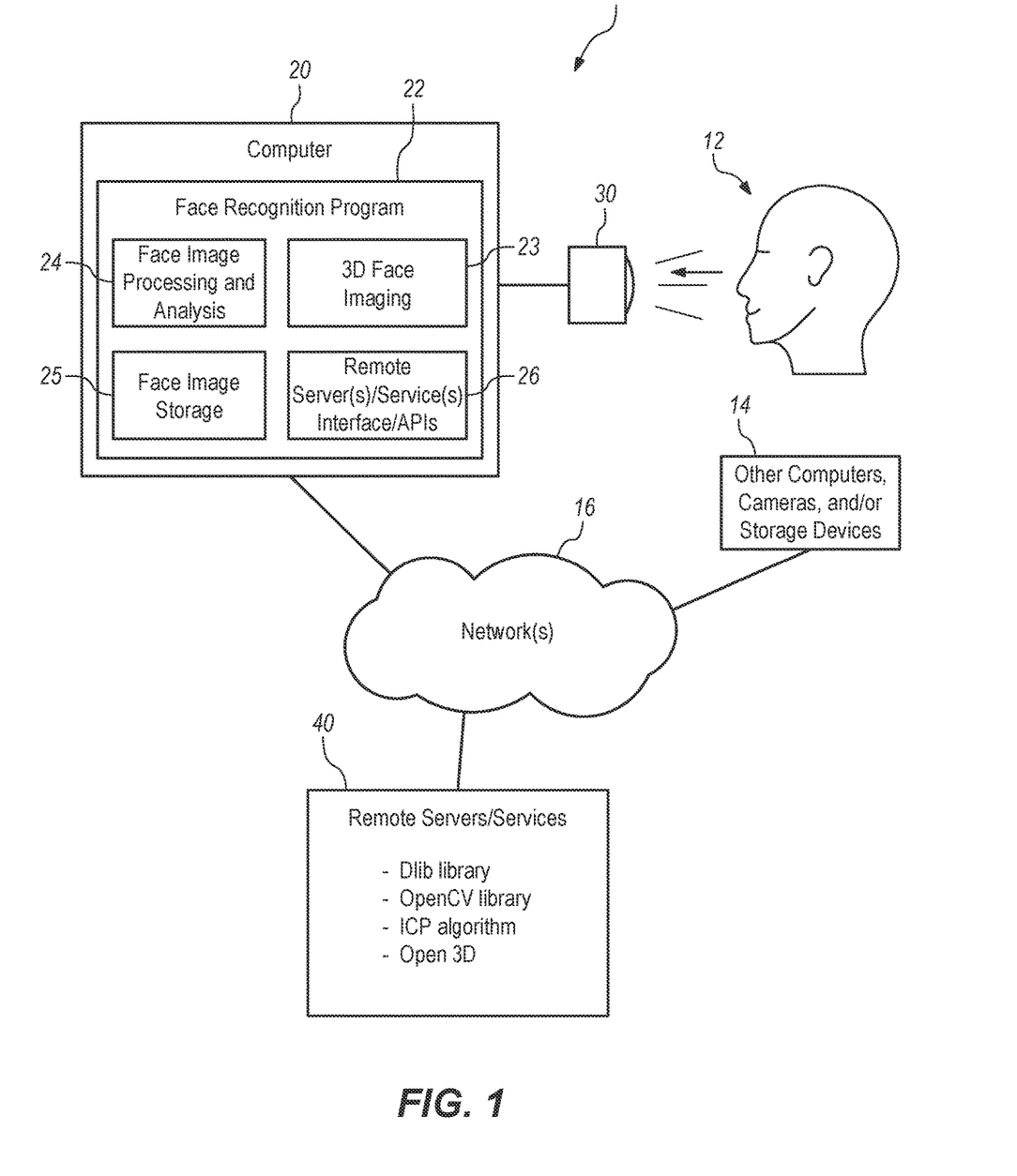
FIG. 1 is a diagram of a system in which one or more embodiments may be performed.

FIG. 1 is a diagram of a system 10 in which one or more embodiments may be performed. A computer 20 is connected to a depth camera 30 for taking three-dimensional images of a face 12 of a person. Alternatively, the computer 20 may receive three-dimensional images of the face 12 from other computers, depth cameras, and/or storage devices 14 over a network 16. The computer 20 runs a face recognition program 22, which may optionally be organized into program modules. The program modules are shown as including a 3D face imaging module 23, face image processing and analysis module 24, face image storage 25, and remote server(s)/service(s) interface/application programming interface (API) 26. For example, the 3D face imaging module 23 may be used to obtain face images, the face image processing and analysis module 24 may co-registration and tolerance checks, the face image storage 25 may store multiple face images or point clouds as well as intermediate data such as correspondence points and transformation matrices for any given face image, and the remote server(s)/service(s) interface/application programming interface (API) 26 may support communications with external systems. In the present system 10, the remote servers/services 40 include, without limitation, a Dlib library, OpenCV library, ICP algorithm and Open3D. The remote server(s)/service(s) interface/application programming interface (API) 26 may send data and requests to any one or more of the remote servers/services 40 and receive output that is returned from the remote servers/services 40.

Figure 2:
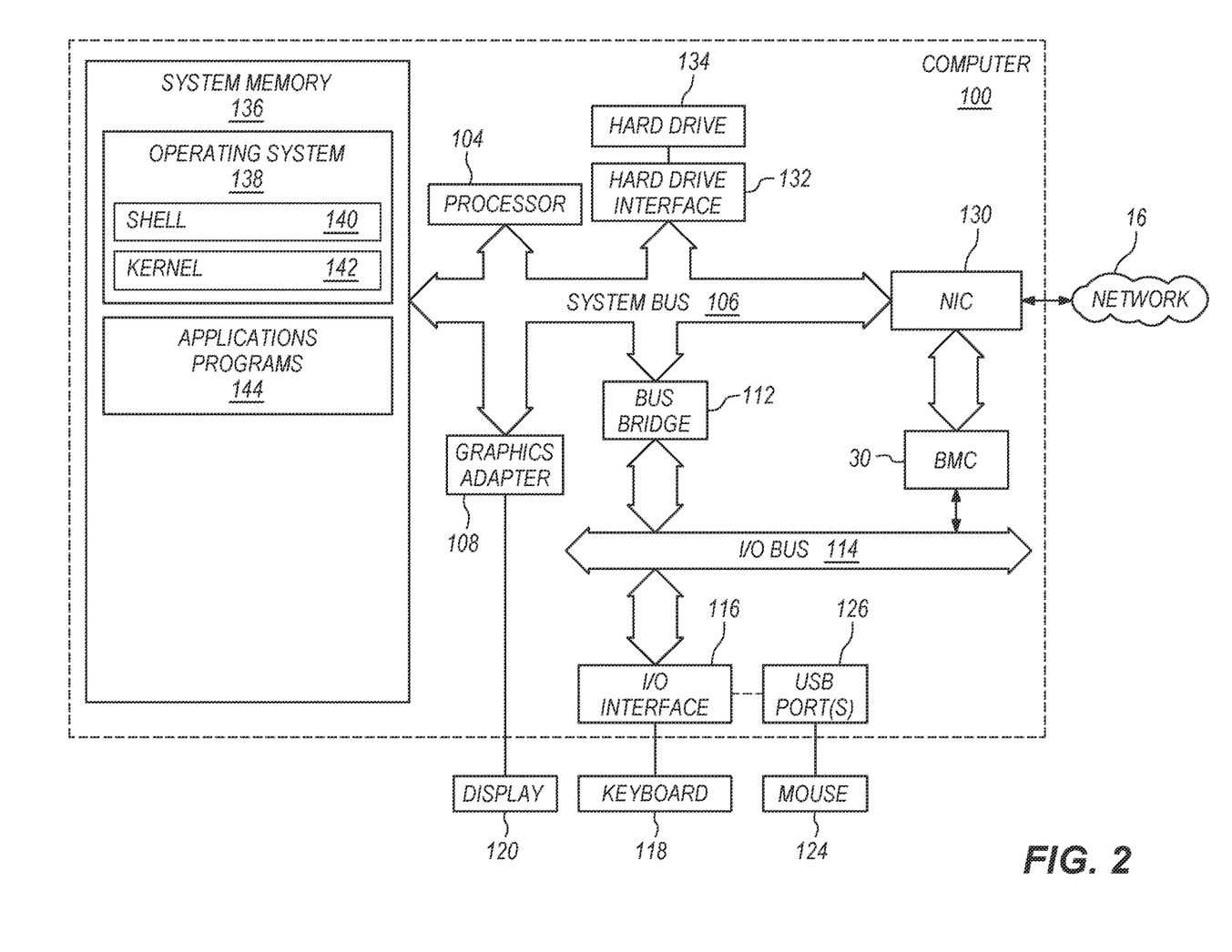
FIG. 2 is a diagram of a computer that may be used to perform a computer program product according to one or more embodiments.

FIG. 2 is a diagram of one embodiment of a computer 100 that may be representative, but not limiting, of the configuration of the computer 20, the other computers 14 and/or the remote servers/services 40 of FIG. 1. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, such as a keyboard 118 (perhaps as a touch screen virtual keyboard), and a USB mouse 124 via USB port(s) 126 (or other type of pointing device, such as a trackpad). The I/O bus 114 may also provide communication to the BMC 30. As depicted, the computer 100 may communicate with other devices over the network 16 using a network adapter or network interface controller (NIC) 130. The hardware elements depicted in the computer 100 are not intended to be exhaustive, but rather are representative. For instance, the computer 100 may include non-volatile memory and the like.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as the lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include a face recognition program 22 (shown in FIG. 1).

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the computer 100 includes application programs 144 in the system memory of the computer 100. Where the computer 100 is representative of a server, the computer may further include a baseboard management controller (BMC) 30 to perform out-of-band processing and monitor and manage various features of the hardware components of the computer.

Figure 3A:
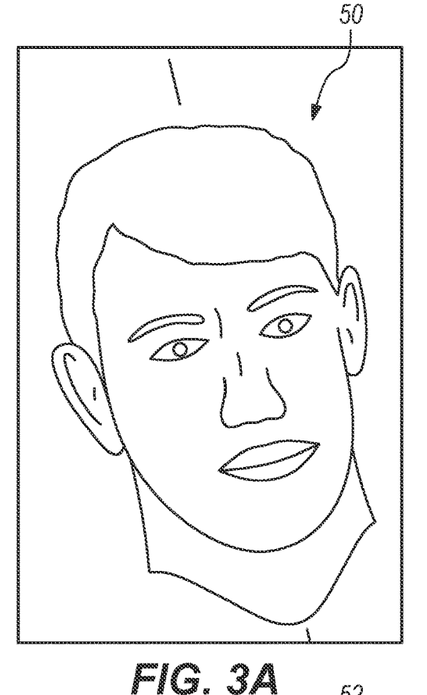
FIGS. 3A-B are diagrams of first and second three-dimensional face images.
Figure 3B:
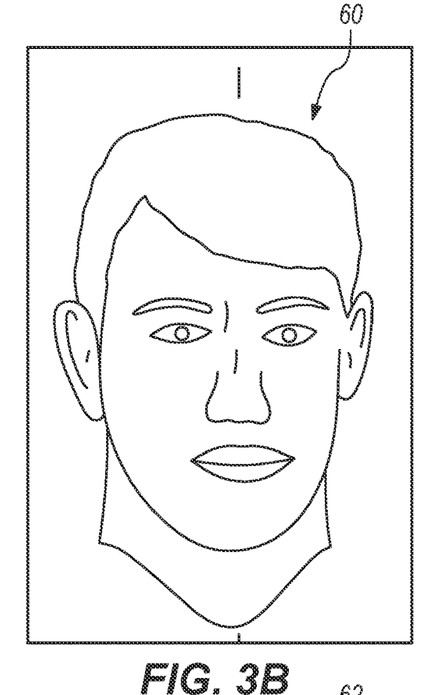

FIGS. 3A-B are diagrams of first and second three-dimensional face images. In FIG. 3A, the first three-dimensional face image 50 is tilted leftward relative to the second three-dimensional face image 60 in FIG. 3B. The tilt is representative of other misalignments that may occur between any two face images. For example, the first face image 50 could be rotated about an X-axis, Y-axis or Z-axis relative to the second face image 60. Furthermore, the first and second face images 50, 60 appear to be images of the same person for the sack of simplicity, but the methods described are applicable to situation where the two face images are of different people. In fact, the face recognition operations described herein are used for the purpose of determining whether the first face image is of the same person as the second face image. Such a determination may be useful in, for example, face verification, face recognition, face clustering and face tracking applications.

Figure 4A:
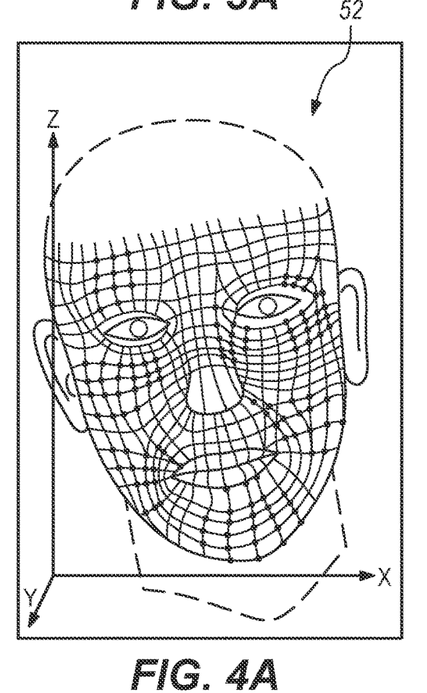
FIGS. 4A-B are diagrams of first and second point clouds representing the first and second three-dimensional face images.
Figure 4B:
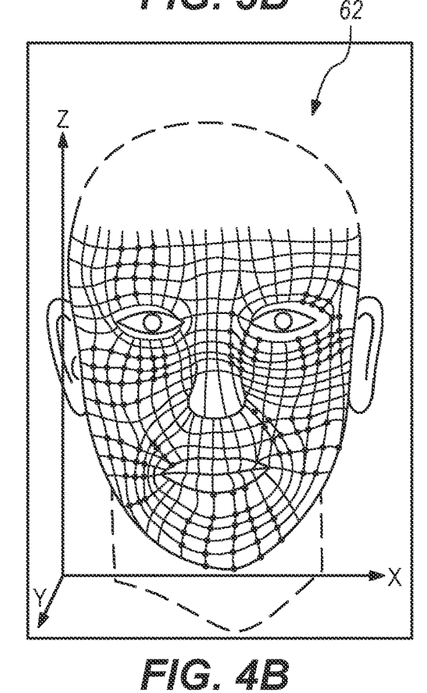

FIGS. 4A-B are diagrams of first and second point clouds 52, 62 representing the first and second three-dimensional face images 50, 60 of FIGS. 3A-B, respectively. Each point in the point clouds has a location in three-dimensional space that may be described with coordinates such as (x, y, z) describing the position along the coordinate axis X, Y and Z shown in FIGS. 4A-B. A point cloud may be nothing more than the set of points but is illustrated as a mesh. In the mesh, the vertices of intersecting lines are the points. However, the mesh may be stored or identified according to the Polygon File Format (PLY). The PLY file format may include a description of the face image as a list of nominally flat polygons. For example, a PLY file may start with a header that specifies the elements of a mesh and their types, where the header is followed by a list of elements such as vertices, faces, edges, range maps and triangle strips. Still, it is the vertices in a PLY file that form a three-dimensional point cloud.

Figure 5A:
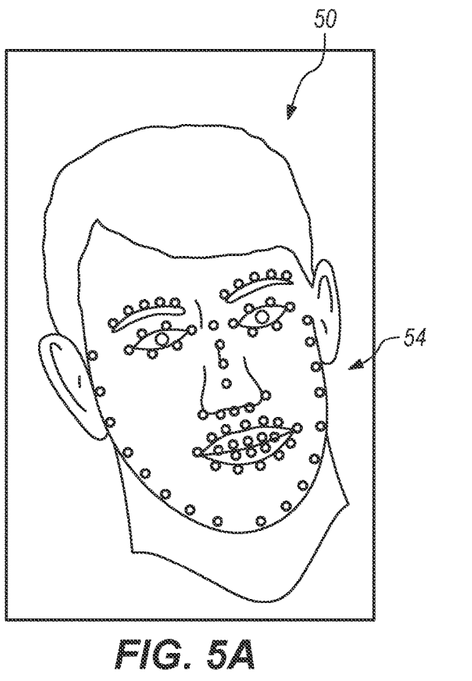
FIGS. 5A-B are diagrams of first and second sets of facial landmarks that may be used as initial correspondences for the first and second three-dimensional face images.
Figure 5B:
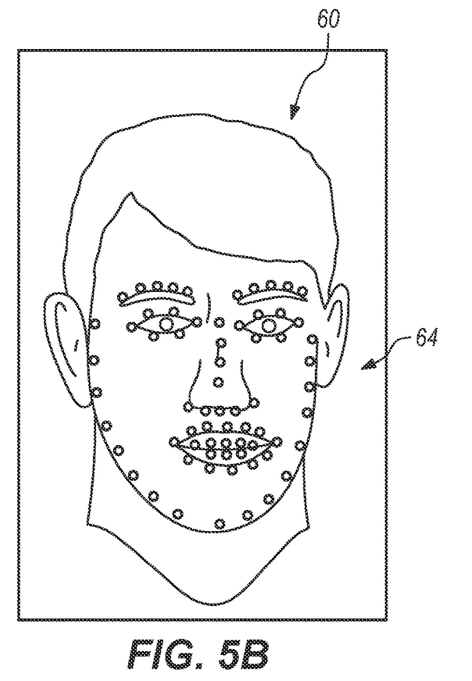

FIGS. 5A-B are diagrams of first and second sets of facial landmarks 54, 64 that may be used as initial correspondences for the first and second three-dimensional face images 50, 60 of FIGS. 3A-B, respectively. The illustrated sets of facial landmarks 54, 64 include 68 facial landmarks selected consistent with the Dlib 68-point model that maps to specific facial structures. For example, a jaw outline is located with points #1-17, a right eyebrow is located with points #18-22, a left eyebrow is located with points #23-27, a nose is located with points #28-36, a right eye is located with points #27-42, a left eye is located with points #43-48, and the mouth or lips are located with points #49-68. However, embodiments may include fewer or more facial landmarks, or the same or different facial landmarks.

Figure 6A:
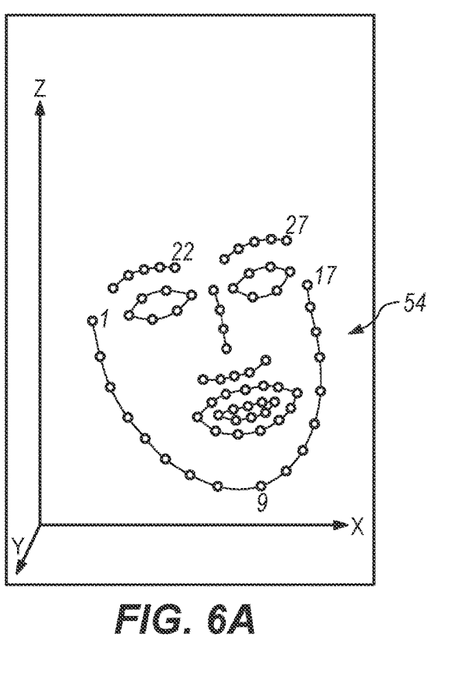
FIGS. 6A-B are diagrams of the first and second sets of facial landmarks illustrating that the position of each point may be described by three-dimensional coordinates.
Figure 6B:
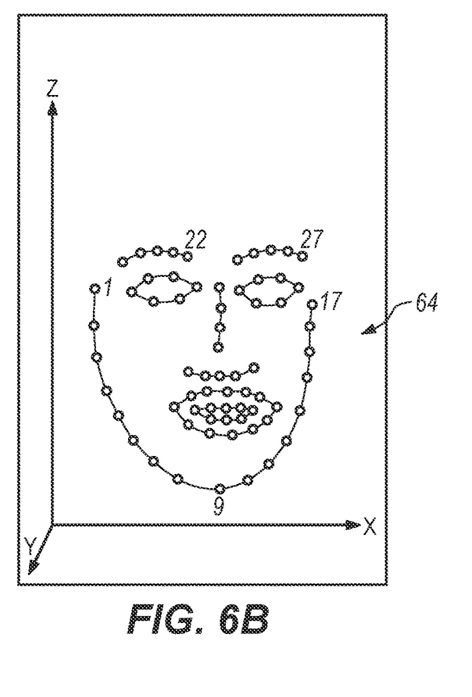

FIGS. 6A-B are diagrams of the first and second sets of facial landmarks 54, 64 illustrating that the position of each point may be described by three-dimensional coordinates, such as (x, y, z) describing the position along the coordinate axis X, Y and Z. The points are illustrated with certain connecting lines only for the purpose of illustration, so that the facial landmarks are more recognizable.

Figure 7A:
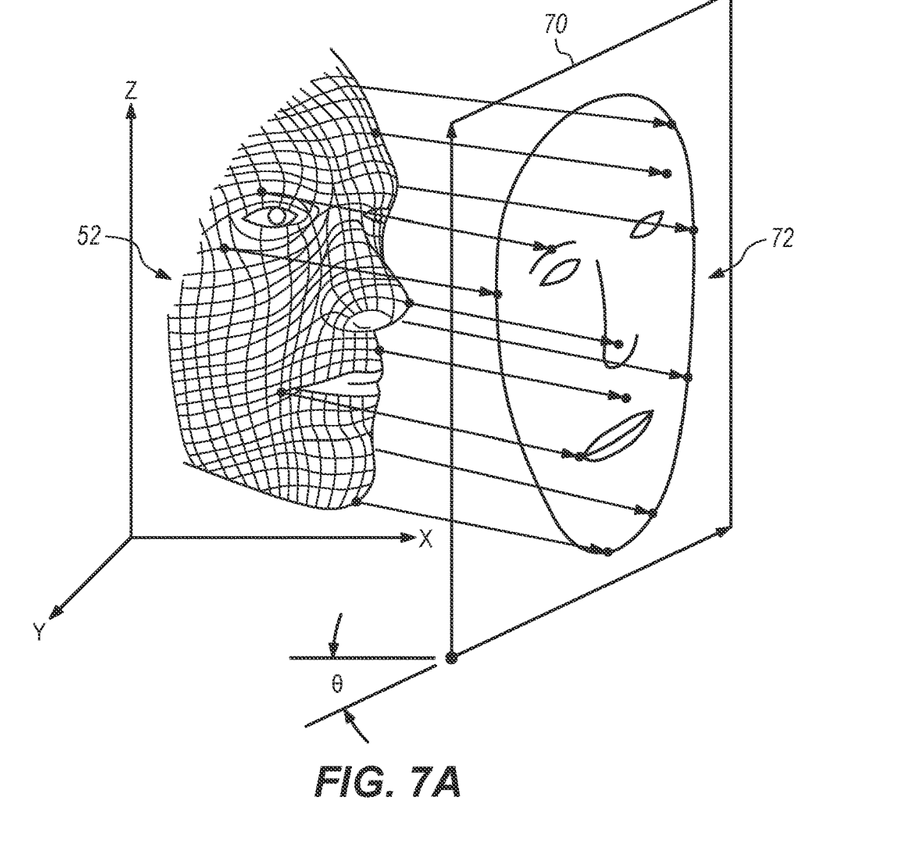
FIGS. 7A-B are diagrams of a first three-dimensional point cloud of a face image being orthogonally projected onto a two-dimensional plane and the resulting two-dimensional point cloud that may be used for facial landmark detection using the Dlib library or other AI-supported landmark detection service.
Figure 7B:
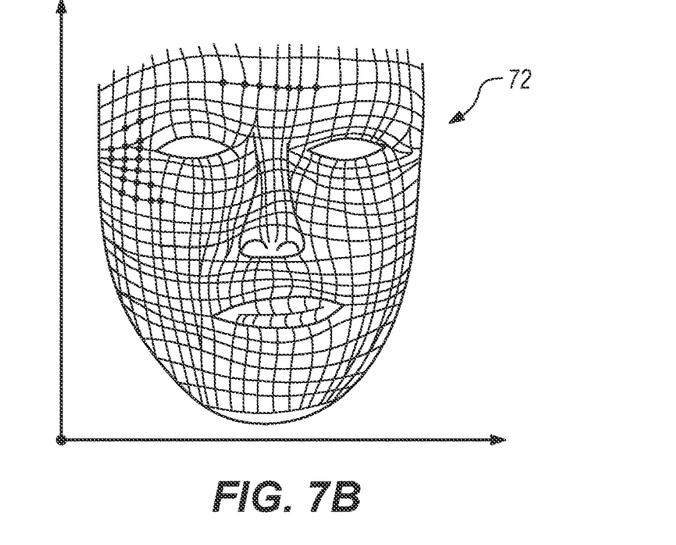

FIGS. 7A-B are diagrams of a first three-dimensional point cloud 52 of a face image 50 being orthogonally projected onto a two-dimensional plane 70 and the resulting two-dimensional point cloud 72 (individual points shown in FIG. 7B) that may be used for facial landmark detection using the Dlib library or other AI-supported landmark detection service. Note that the two-dimensional plane 70 is angled within the three-dimensional coordinate system in order to be an orthogonal plane relative to the forward-facing direction of the first three-dimensional point cloud 52. Without limitation, the plane 70 may be equidistant from the left eye, right eye and chin. FIG. 7A includes a few parallel arrows illustrating the projection of individual point in the three-dimensional point cloud 52 onto the plane 70 to form the two-dimensional point cloud 72. Optionally, the orthogonal projection may be performed using OpenCV (Open Source Computer Vision, a python library). The two-dimensional point cloud 72 is shown in greater detail in FIG. 7B and represents the input provided to Dlib for facial landmark detection. Using the same orthogonal projection, the facial image corresponding to the point cloud 52 may be provided to Dlib for the same purpose.

Figure 8A:
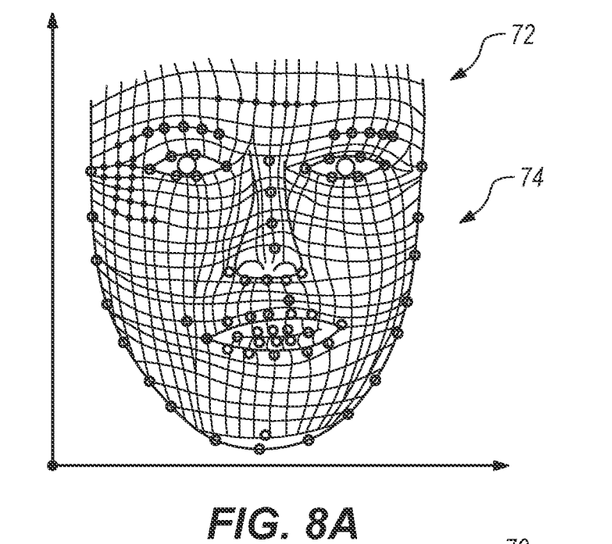
FIGS. 8A-B are diagrams illustrating the facial landmarks identified by the Dlib library in a two-dimensional plane and the two-dimensional facial landmarks being orthogonally projected onto the three-dimensional point cloud of the face image.
Figure 8B:
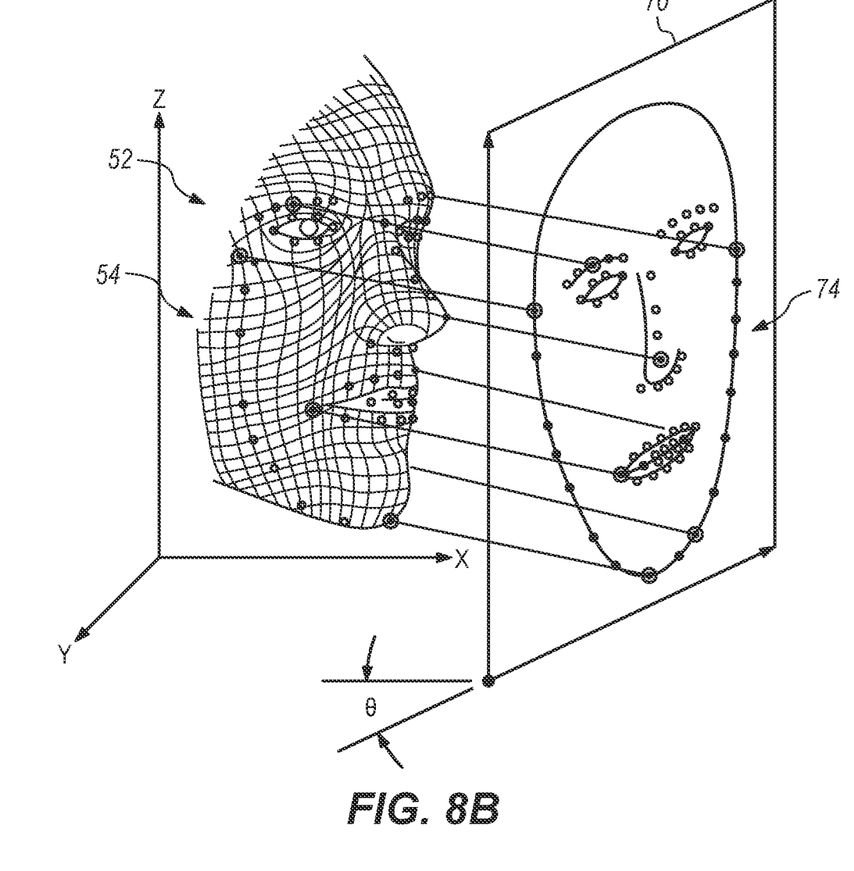

FIGS. 8A-B are diagrams illustrating the 2D facial landmarks 74 identified by the Dlib library in the two-dimensional plane 70 (See FIGS. 7A and 8B). FIG. 8A represents the output of Dlib that is returned to the face recognition program of various embodiments. While the 2D facial landmarks 74 are shown superimposed on the 2D point cloud 72, it is not required for Dlib to return the point cloud 72 since that information is already possessed by the face recognition program and is not utilized in the reverse projection. Rather, it is sufficient for Dlib to provide the two-dimensional coordinates of each point in the set of facial landmarks 74 that have been identified. FIG. 8B illustrates the two-dimensional facial landmarks 74 being orthogonally projected back onto the three-dimensional point cloud 52 of the face image 50 in FIG. 8B. Optionally, the orthogonal projection may be performed using OpenCV (Open Source Computer Vision, a python library). The result of the reverse orthogonal projection shown in FIG. 8B is the identification of the three-dimensional facial landmarks 54 on the three-dimensional point cloud 52. The three-dimensional facial landmarks 54 thus obtained may be subsequently used as the initial correspondence points for co-registration with another face image in a face recognition process. Should any the three-dimensional facial landmarks 54 result in a point that does not already exist in the three-dimensional point cloud, a new point may be added to the point cloud or an existing point that is closest to the point may be used as an approximation of the three-dimensional facial landmark.

Figure 9:
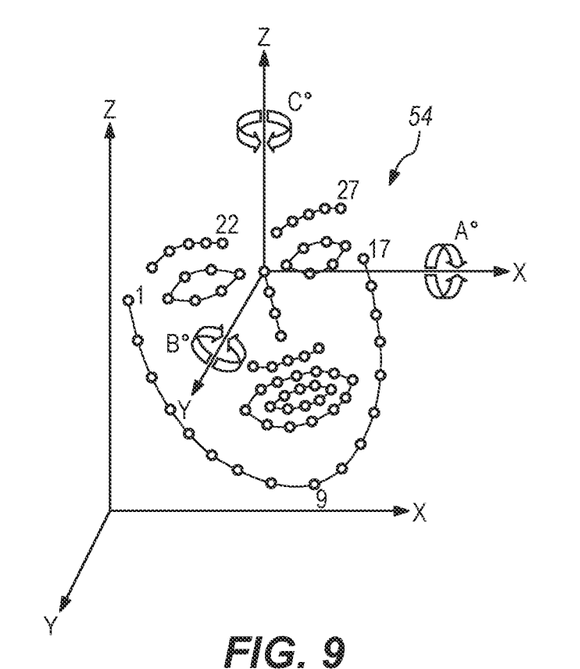
FIG. 9 is a diagram illustrating that the three-dimensional facial may be used as initial correspondence points that can be transformed (rotated, translated) in various directions to be co-registered with another three-dimensional face image.

FIG. 9 is a diagram illustrating that the three-dimensional facial landmarks 54 may be used as initial correspondence points that can be transformed (rotated, translated) in various directions (see bold arrows showing rotation about X, Y and Z axis) to be co-registered with another three-dimensional face image (not shown). The amount and type of movement necessary to co-register the initial correspondence points (such as the facial landmarks 54) with the initial correspondence points (such as matched facial landmarks) of a second face image may be described in a transformation matrix.

Figure 10:
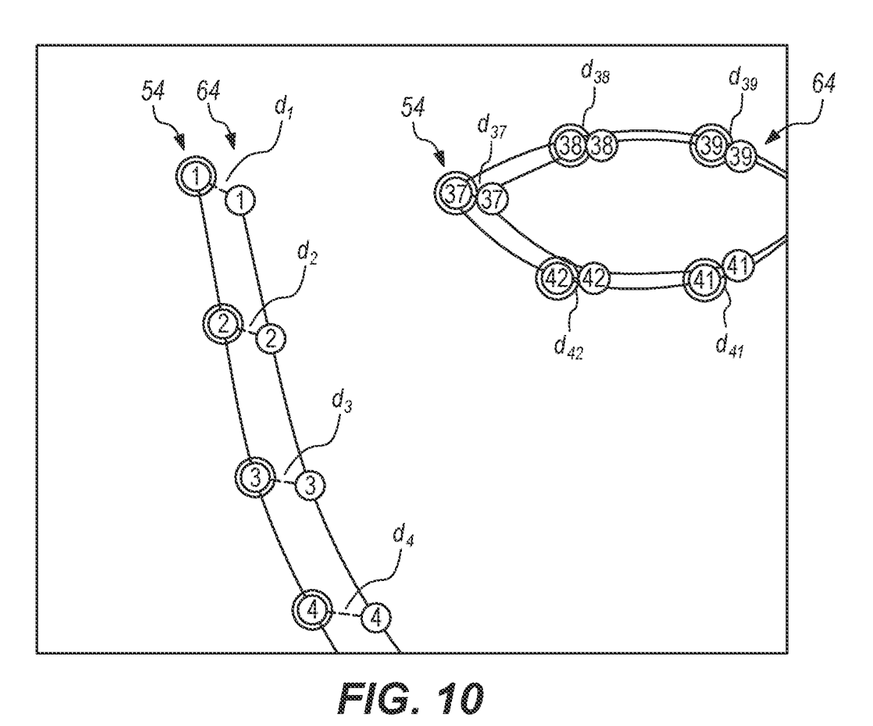
FIG. 10 is a diagram illustrating a few initial correspondence points (1-4, 37-39 and 41-42) of first and second three-dimensional point clouds and the distances between matched/corresponding points after applying an initial transformation to the first point cloud.

FIG. 10 is a diagram illustrating a first set of initial correspondence points 54 from a first face image (i.e., facial landmarks #1-4, 37-39 and 41-42 in double circles) and a second set of initial correspondence points 64 for a second face image (i.e., facial landmarks #1-4, 37-39 and 41-42 in single circles). Each of the initial correspondence points 54 in the first set (double circled) are matched with an initial correspondence point 64 in the second set (single circled) according to the specific facial structure or feature that is identified by the matched points. Accordingly, facial landmark #37 in the first set of initial correspondence points 54 is matched with landmark #37 in the second set of initial correspondence points 64, since the landmark #37 is the outer corner of a right eye of the person in the image. Each numbered facial landmark in one set is matched with the similarly numbered facial landmark in the other set. The distances (de) between matched/corresponding pairs of correspondence points (i.e., landmark #) may be used in calculating an error metric or tolerance that indicates how well the two sets of initial correspondences 54, 64 are co-registered.

Figure 11:
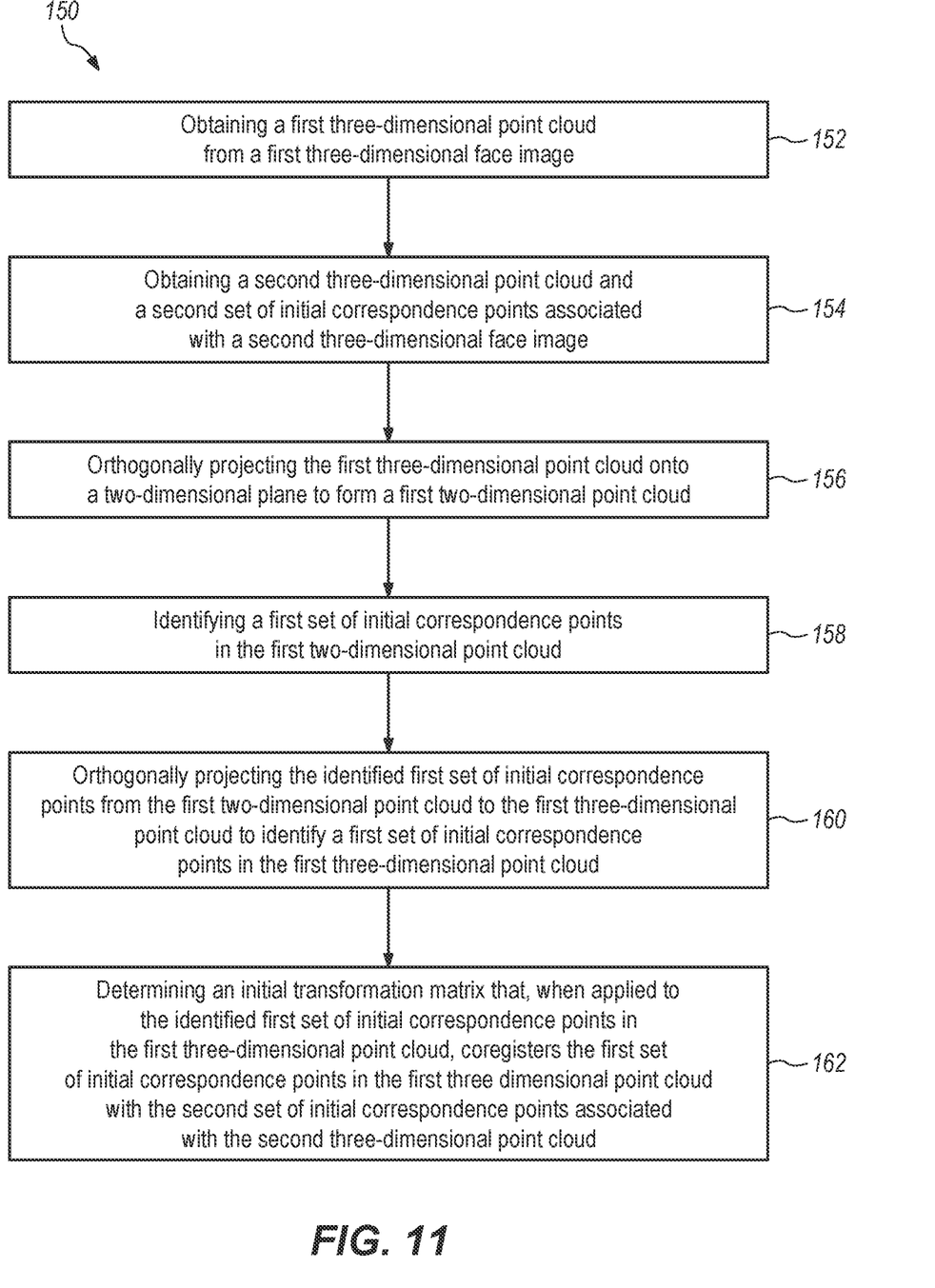
FIG. 11 is a flowchart of operations according to some embodiments.

FIG. 11 is a flowchart of operations 150 according to some method or computer program product embodiments. Operation 152 includes obtaining a first three-dimensional point cloud from a first three-dimensional face image. Operation 154 includes obtaining a second three-dimensional point cloud and a second set of initial correspondence points associated with a second three-dimensional face image. Operation 156 includes orthogonally projecting the first three-dimensional point cloud onto a two-dimensional plane to form a first two-dimensional point cloud. Operation 158 includes identifying a first set of initial correspondence points in the first two-dimensional point cloud. Operation 160 includes orthogonally projecting the identified first set of initial correspondence points from the first two-dimensional point cloud to the first three-dimensional point cloud to identify a first set of initial correspondence points in the first three-dimensional point cloud. Operation 162 includes determining an initial transformation matrix that, when applied to the identified first set of initial correspondence points in the first three-dimensional point cloud, co-registers the first set of initial correspondence points in the first three dimensional point cloud with the second set of initial correspondence points associated with the second three-dimensional point cloud.

Figure 12:
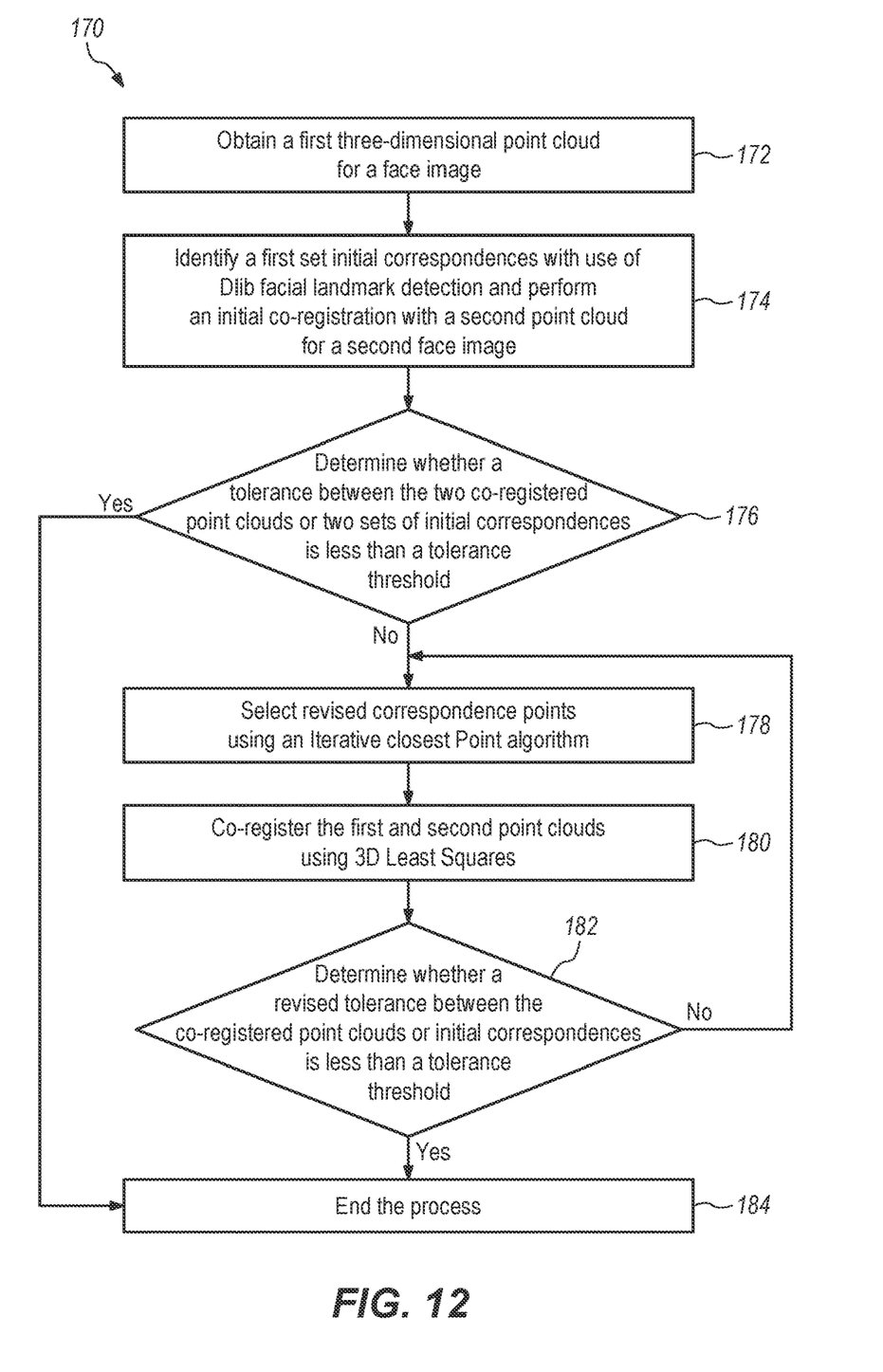
FIG. 12 is a flowchart of operations according to some embodiments.

FIG. 12 is a high-level flowchart 170 according to some method or computer program product embodiments. In flowchart 170, the operations of FIG. 11 are condensed into operations 172, 174 of FIG. 12. Operation 172 includes obtaining a first three-dimensional point cloud for a face image. Operation 174 includes identifying a first set initial correspondences with use of Dlib facial landmark detection and perform an initial co-registration with a second point cloud for a second face image. Operation 176 includes determining whether a tolerance between the two co-registered point clouds or two sets of initial correspondences is less than a tolerance threshold. A positive ("Yes") determination leads to the end of the process in operation 184, whereas a negative ("No") determination leads to operation 178. Operation 178 includes selecting revised correspondence points using an Iterative Closets Point algorithm. Operation 180 includes co-registering the first and second point clouds using 3D Least Squares. Operation 182 includes determining whether a revised tolerance between the co-registered point clouds or initial correspondences is less than a tolerance threshold. A positive ("Yes") determination in operation 182 leads to operation 184 where the process ends. However, a negative ("No") determination in operation 182 leads back to operation 178. Operations 178, 180, 182 are repeated or iterated until reaching a revised tolerance that is less than the tolerance threshold. Optionally, some limited number of iterations or other stop condition may be implemented.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   obtaining a first three-dimensional point cloud from a first three-dimensional face image;
   obtaining a second three-dimensional point cloud and a second set of initial correspondence points associated with a second three-dimensional face image;
   orthogonally projecting the first three-dimensional point cloud onto a two-dimensional plane to form a first two-dimensional point cloud;
   identifying a first set of initial correspondence points in the first two-dimensional point cloud;
   orthogonally projecting the identified first set of initial correspondence points from the first two-dimensional point cloud to the first three-dimensional point cloud to identify a first set of initial correspondence points in the first three-dimensional point cloud; and
   determining an initial transformation matrix that, when applied to the identified first set of initial correspondence points in the first three-dimensional point cloud, coregisters the first set of initial correspondence points in the first three dimensional point cloud with the second set of initial correspondence points associated with the second three-dimensional point cloud.

2. The computer program product of claim 1, wherein determining the initial transformation matrix includes:
   matching each point in the first set of initial correspondence points in the first three-dimensional point cloud with a corresponding point in the second set of initial correspondence points in the second three-dimensional point cloud; and
   calculating the initial transformation matrix to minimize an error metric based on distances between the matched points in the first and second three-dimensional point clouds.

3. The computer program product of claim 2, wherein the first set of initial correspondence points includes a set of facial landmarks in the first three-dimensional face image and the second set of initial correspondence points includes a set of facial landmarks in the second three-dimensional face image.

4. The computer program product of claim 1, wherein the error metric based on distances between the matched points in the first and second three-dimensional point cloud is the sum of the squares of distances between the matched points.

5. The computer program product of claim 1, wherein identifying the first set of initial correspondence points in the first two-dimensional point cloud includes:
   providing the first two-dimensional point cloud to the Dlib digital image processing library; and
   receiving two-dimensional coordinates for each point in the first set of initial correspondence points in the first two-dimensional point cloud from the Dlib digital image processing library.

6. The computer program product of claim 5, wherein the first set of initial correspondence points in the first two-dimensional point cloud includes a set of two-dimensional coordinates for facial landmarks detected using the Dlib digital image processing library.

7. The computer program product of claim 1, wherein the first and second three-dimensional face images are obtained from one or more depth cameras.

8. The computer program product of claim 1, wherein the first and second three-dimensional point clouds utilize the Polygon File Format.

9. The computer program product of claim 1, wherein the first set of initial correspondence points in the first three-dimensional point cloud are identified automatically without human intervention.

10. The computer program product of claim 1, wherein projecting the identified first set of initial correspondence points from the first two-dimensional point cloud to the first three-dimensional point cloud to identify a first set of initial correspondence points in the first three-dimensional point cloud includes:
    providing the two-dimensional coordinates for each point in the first set of initial correspondence points in the first two-dimensional point cloud and the first three-dimensional point cloud to the Open Source Computer Vision library; and
    receiving three-dimensional coordinates for each point in the first set of initial correspondence points in the first three-dimensional point cloud from the Open Source Computer Vision library.

11. The computer program product of claim 1, wherein the second set of initial correspondence points associated with a second three-dimensional face image are obtained by:

projecting the second three-dimensional point cloud onto a two-dimensional plane to form a second two-dimensional point cloud;

identifying a second set of initial correspondence points in the second two-dimensional point cloud; and projecting the identified second set of initial correspondence points from the second two-dimensional point cloud to the second three-dimensional point cloud to identify the second set of initial correspondence points in the second three-dimensional point cloud.

12. The computer program product of claim 1, wherein projecting the first three-dimensional point cloud onto a two-dimensional plane to form a first two-dimensional point cloud and projecting the identified set of initial correspondence points from the first two-dimensional point cloud to the first three-dimensional point cloud to identify initial correspondence points in the first three-dimensional point cloud are performed using the same field of view for the first three-dimensional point cloud.

13. The computer program product of claim 1, the operations further comprising:

selecting a field of view of the first three-dimensional point cloud that includes facial features corresponding to the identified set of initial correspondence points, wherein the facial features include eyes, eyebrows, nose, mouth, and jaw in the first three-dimensional face image.

14. The computer program product of claim 1, wherein each point in each three-dimensional point cloud is represented by three-dimensional coordinates.

15. The computer program product of claim 1, wherein orthogonally projecting the first three-dimensional point cloud onto a two-dimensional plane to form a first two-dimensional point cloud includes providing the first three-dimensional point cloud and a selected field of view to the projectPoints function in the Open Source Computer Vision Library.

16. The computer program product of claim 1, the operations further comprising:

determining which of the first and second three-dimensional point clouds has the fewest number of points;

calculating an initial tolerance value based on, for each point in the first or second point cloud having the fewest number of points, a distance between the point and the closest point in the other of the first or second point cloud after applying the initial transformation matrix to the first three-dimensional point cloud; and determining whether the calculated initial tolerance value is less than a predetermined tolerance value.

17. The computer program product of claim 1, the operations further comprising:

(i) identifying revised correspondence points in the first and second three-dimensional point clouds including, for each point in the first three-dimensional point cloud, a corresponding point in the second three-dimensional point cloud that is the closest to the point in the first three-dimensional point cloud;

(ii) determining a revised transformation matrix that minimizes a first error metric based on distances between the revised correspondence points in the first and second three-dimensional point clouds;

(iii) applying the revised transformation matrix to the first three-dimensional point cloud;

(iv) calculating a revised tolerance value based on, for each point in the first or second point cloud having the fewest number of points, a distance between the point and the closest point in the other of the first or second point cloud after applying the revised transformation matrix to the first three-dimensional point cloud; and repeating operations (i), (ii), (iii) and (iv) until the revised tolerance value is less than a predetermined tolerance threshold.

18. The computer program product of claim 17, wherein the first error metric based on distances between the revised correspondence points in the first and second three-dimensional point clouds is a sum of the squares of the distances between the revised correspondence points in the first and second three-dimensional point clouds.

19. The computer program product of claim 17, wherein steps (i) and (ii) are performed using the Iterative Closest Point algorithm, the operation further comprising:

providing the second three-dimensional point cloud and the first three-dimensional point cloud after applying the revised transformation matrix as inputs to the Iterative Closest Point algorithm.

20. The computer program product of claim 17, wherein operations (i), (ii) and (iii) are initiated only in response to the calculated initial tolerance value being greater than the predetermined tolerance threshold after applying the initial transformation matrix to the identified first set of initial correspondence points in the first three-dimensional point cloud.

* * * * *